United States Patent
Cui et al.

(10) Patent No.: US 12,121,902 B2
(45) Date of Patent: Oct. 22, 2024

(54) PORTABLE SAMPLE LOADING DEVICE

(71) Applicant: MGI Tech Co., Ltd., Shenzhen (CN)

(72) Inventors: Xing-Ye Cui, Shenzhen (CN); Zi-Hua Niu, Shenzhen (CN); Chu-Tian Xing, Shenzhen (CN); Jian Liu, Shenzhen (CN)

(73) Assignee: MGI Tech Co., Ltd., Shenzhen (CN)

( * ) Notice: Subject to any disclaimer, the term of this patent is extended or adjusted under 35 U.S.C. 154(b) by 727 days.

(21) Appl. No.: 17/413,039

(22) PCT Filed: Dec. 13, 2018

(86) PCT No.: PCT/CN2018/120864
§ 371 (c)(1),
(2) Date: Jun. 11, 2021

(87) PCT Pub. No.: WO2020/118610
PCT Pub. Date: Jun. 18, 2020

(65) Prior Publication Data
US 2022/0016633 A1    Jan. 20, 2022

(51) Int. Cl.
*B01L 9/00*    (2006.01)
*G01N 35/10*    (2006.01)

(52) U.S. Cl.
CPC ............... *B01L 9/52* (2013.01); *G01N 35/10* (2013.01); *B01L 2200/025* (2013.01); *B01L 2300/0819* (2013.01)

(58) Field of Classification Search
CPC ...... B01L 3/502715; B01L 9/52; B01L 9/527; B01L 2200/025; B01L 2200/027;
(Continued)

(56) References Cited

U.S. PATENT DOCUMENTS

2001/0029794 A1* 10/2001 Frye ..................... B01L 3/50853
73/864.81
2016/0279631 A1* 9/2016 Lee ..................... B01L 3/502715
(Continued)

FOREIGN PATENT DOCUMENTS

| CN | 205576154 U | * | 9/2016 |
| CN | 205815732 U | | 12/2016 |
| WO | 2012096703 A1 | | 7/2012 |

*Primary Examiner* — Matthew D Krcha
*Assistant Examiner* — Austin Q Le
(74) *Attorney, Agent, or Firm* — ScienBiziP, P.C.

(57) ABSTRACT

A portable sample loading device (1,4,7) include a base (11,41,71) and a fixing device (11,41,71) connected to the base (12,42,72). The base (12,42,72) can support a chip (2,5) and a sample loading connector (3,6). The fixing device (12,42,72) can detachably retain the chip (2,5) and the sample loading connector (3,6) on the base (11,41,71). The base (11,41,71) includes a front surface (110,410,710) and a back surface (111,411,711) opposite to the front surface (110,410,710). The front surface (110,410,710) includes a supporting surface for supporting the chip (2,5). A region of the supporting surface (112,412,712) corresponds to a sample inlet of the chip (2,5) is recessed toward the back surface (111,411,711) to form a receiving space (114,117, 414,714) for receiving the sample loading connector (3,6). The receiving space (114,117,414,714) further defines a sample injection hole (115, 415,715) corresponding to the sample inlet of the chip (2,5).

17 Claims, 15 Drawing Sheets

(58) Field of Classification Search
CPC ........... B01L 2200/04; B01L 2300/043; B01L 2300/0816; B01L 2300/0819; G01N 35/10
See application file for complete search history.

(56) References Cited

U.S. PATENT DOCUMENTS

2016/0279640 A1* 9/2016 Iqbal ....................... B01L 9/527
2018/0185849 A1   7/2018 Kaplan et al.
2019/0091682 A1* 3/2019 Drews ................. B01L 3/50853

* cited by examiner

PORTABLE SAMPLE LOADING DEVICE

FIELD

The subject matter relates to a sample loading device, and more particularly, to a passive portable sample loading device.

BACKGROUND

In gene sequencing, key factors that need to be considered during a sample loading process include maintaining activity of nucleic acid molecules to be tested, avoiding generation of bubbles, and ensuring a uniformity of the nucleic acid molecules to be tested on the sequencing biochip. At present, in order to achieve the above sample loading purpose, major sequencer manufacturers have developed automatic sample loading devices. However, such sample loading devices rely heavily on complex pump valve devices.

The sample loading technologies that rely on the pump valve devices includes following main problems. 1. The consumption of sequencing library sample is large, which is about one hundred microliters. 2. Generally, in order to decrease the number of pump valves and the complexity of the control program, negative pressure is used to drive the sample to flow, which in turn increases the sealing requirements of the pipeline and also causes vacuum and bubble to generate in the local pipeline due to an excessive pressure drop therein. 3. Due to a need for an external power supply, the flexibility and the portability of the device are poor.

In addition, since some sequencing samples are rare (such as genome samples of endangered species, genomes of rare cases, etc.) and the sample preparation process is the complex and high costing, the sample loading devices need to be equipped with high controllability. Therefore, it is needed to control the quality during the sample loading process. However, in practical application of sequencing flow cell, simple and effective tools that can quantitatively evaluate the sample loading process are absent.

SUMMARY

In order to solve the above-mentioned and other potential problems, a portable sample loading device is needed.

A portable sample loading device includes a base and a fixing device connected to the base. The base is configured to support a chip and a sample loading connector, the fixing device is configured to detachably retain the chip and the sample loading connector on the base. The base includes a front surface and a back surface opposite to the front surface. The front surface includes a supporting surface configured for supporting the chip. A region of the supporting surface corresponds to a sample inlet of the chip is recessed toward the back surface to form a receiving space configured for receiving the sample loading connector. The receiving space further defines a sample injection hole corresponding to the sample inlet of the chip.

Moreover, the portable sample loading device further includes a locking device. The locking device is operable to engage the fixing device with the base or disengaged the fixing device from the base.

Moreover, one end of the fixing device is pivotally connected and rotate around the base, when the end of the fixing device rotates around the base. Another end of the fixing device moves towards or away from the base, and is able to engage with the base by the locking device when moving towards the base.

Moreover, the base defines a through hole corresponding to a sample outlet of the chip.

Moreover, the locking device includes a buckle, a button portion, and a reset portion. The buckle and the reset portion are disposed on the button portion. The buckle is configured to engage the fixing device with the base. The button portion is configured to drive the buckle to retract under an external force, causing the fixing device to disengage from the base. The reset portion is configured to push the button portion after the external force is removed from the button portion, causing the button portion to drive the buckle to extend and then engage the fixing device with the base.

Moreover, the locking device is disposed on the back surface of the base, and a region of the back surface is recessed toward the front surface to form a receiving room for receiving the locking device. A sidewall of the receiving room defines a through hole, the buckle is configured to extend through or retract from the through hole, thereby engaging the fixing device with or disengaged the fixing device from the base.

Moreover, the sidewall of the receiving room further defines a notch. The button portion is exposed from the notch for the external force to press.

Moreover, the portable sample loading device further includes a cover plate disposed above and covering the receiving room. The cover plate includes a limit portion configure to limit a moving distance of the button portion when being pressed.

Moreover, the reset portion is an elastic element.

Moreover, the portable sample loading device further includes a visualization window corresponding to the chip. The visualization window allows for observation of states of a biological sample in the chip.

Moreover, the visualization window includes scale marks for marking spaces inside the chip that is fillable with the biological sample.

Moreover, the visualization window is disposed on the fixing device.

Moreover, the portable sample loading device further includes a reflecting mirror. The reflecting mirror is disposed above the base by a supporting structure or magnetic attraction, and the reflecting mirror faces the visualization window. Moreover, the portable sample loading device further includes a supporting substrate configured for supporting the portable sample loading device in an upright state.

Moreover, the supporting substrate is rotatable relative to one end of the base. The supporting substrate is received in the base when rotating to a state, and supports the portable sample loading device in the upright state when rotating to another state.

Moreover, the back surface of the base is recessed toward the front surface to form a receiving portion for receiving the supporting substrate.

Moreover, the front surface is recessed towards the back surface to form the supporting surface.

Moreover, the portable sample loading device loads a biological sample to the chip through capillary force or gravity.

The portable sample loading device is portable and small in size, and the operation is simple. There is no dead volume, and the sample consumption is small. 3. During the sample loading process, the factors influencing the sample loading effect, including the flow speed, the flow state, and the bubble position, can be visually observed without complex sensor devices such as flow meters or computer control programs. The sample loading manner is flexible, which includes loading a same sample or different samples into the channels of the single chip.

BRIEF DESCRIPTION OF THE DRAWINGS

Implementations of the present technology will now be described, by way of embodiment, with reference to the attached figures. Obviously, the drawings are only some embodiments of the present disclosure. For those of ordinary skill in the art, other drawings can be obtained based on these drawings without creative work.

SYMBOL DESCRIPTION OF MAIN COMPONENTS

Figure 1:
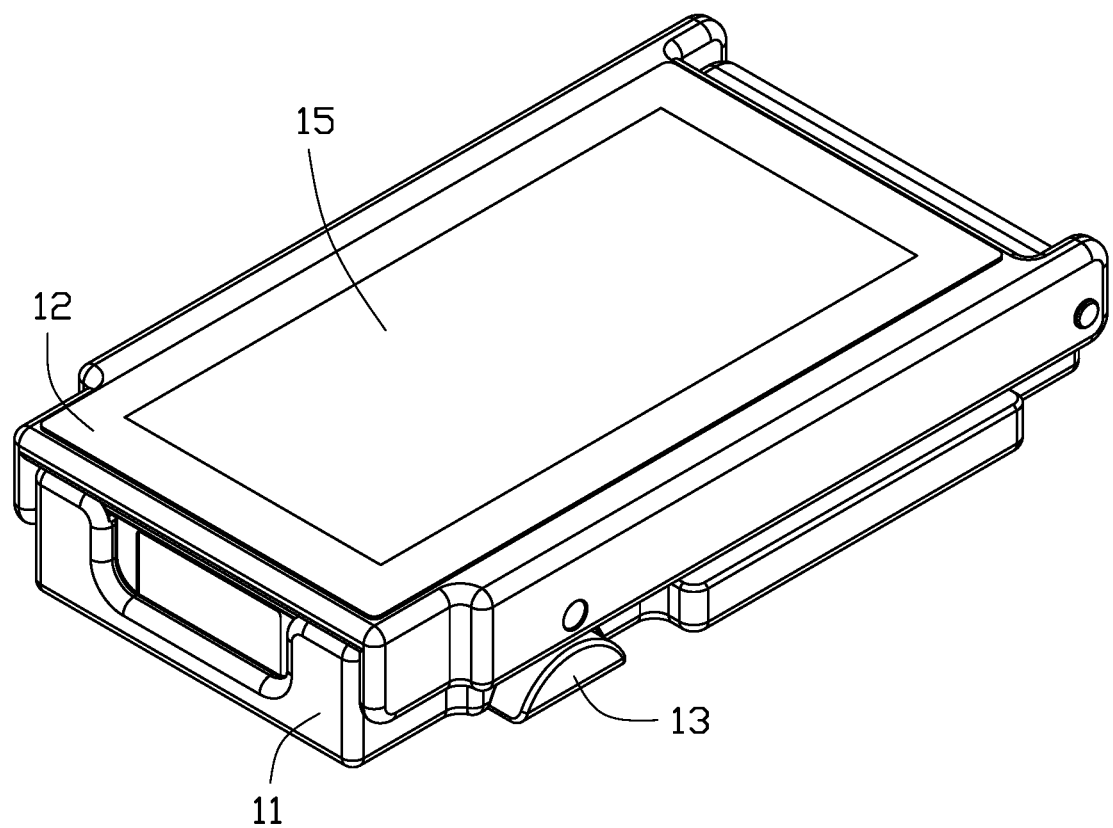
FIG. 1 is an isometric view of a first embodiment of a portable sample loading device according to the present disclosure.
Figure 2:
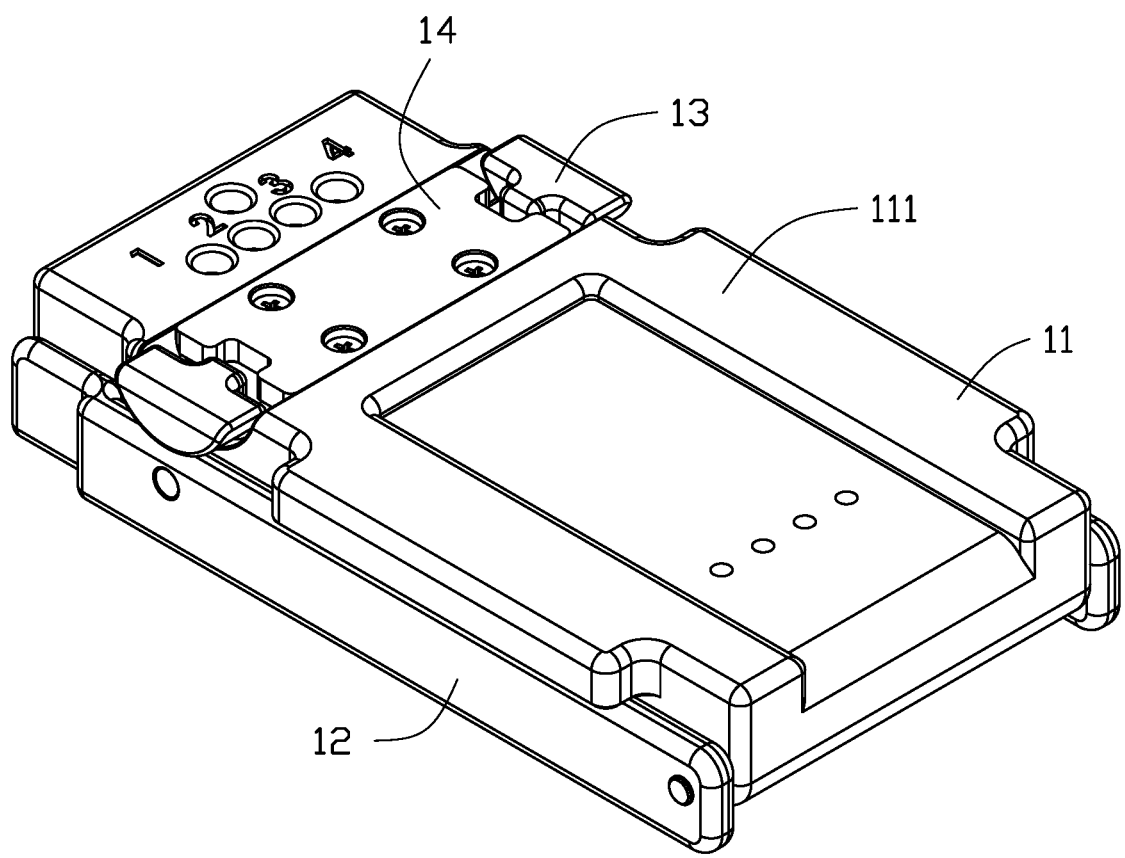
FIG. 2 is an isometric view of the portable sample loading device of FIG. 1, from another angle.
Figure 3:
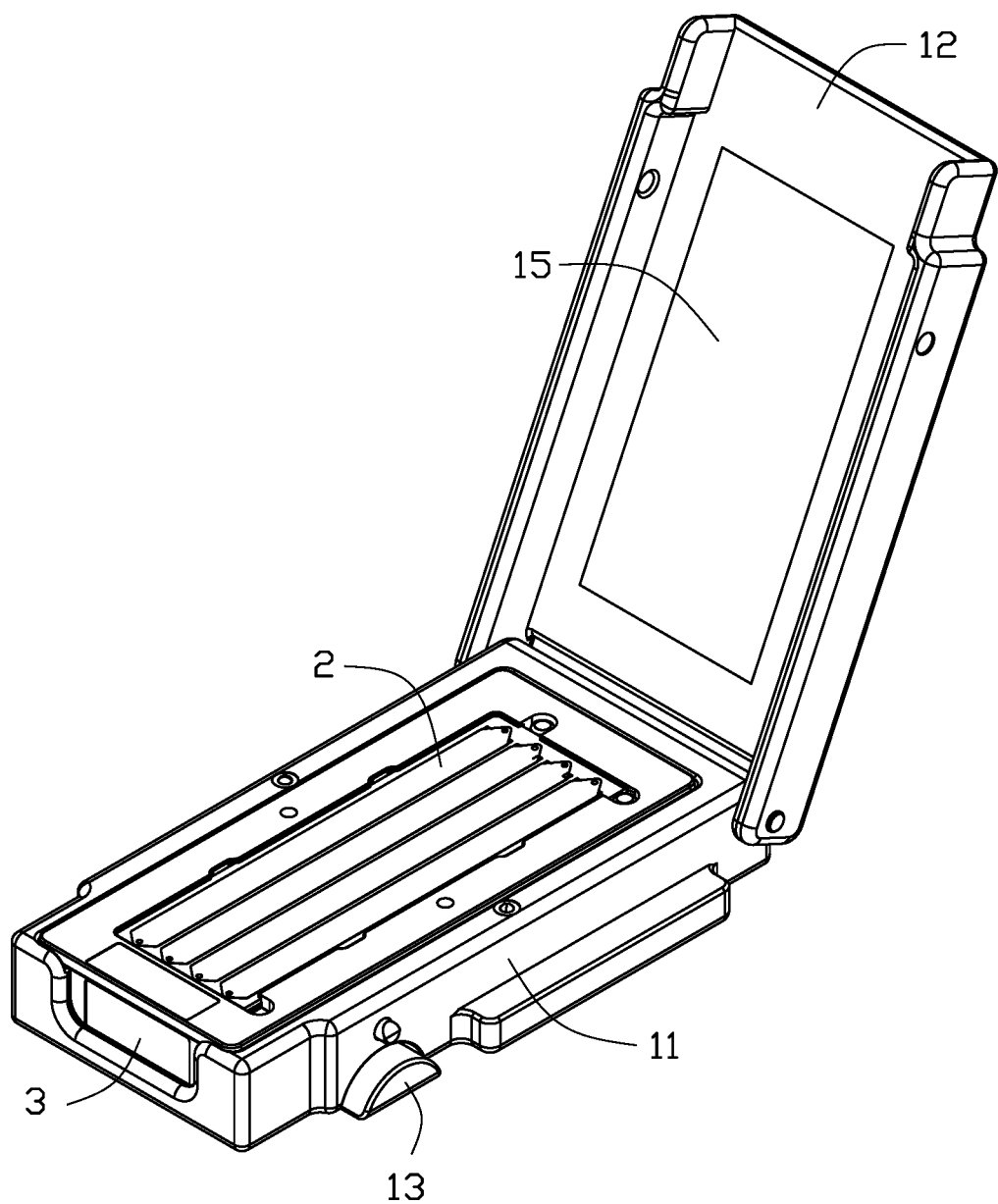
FIG. 3 is an isometric view showing a sequencing chip loaded on the portable sample loading device of FIG. 1.
Figure 4:
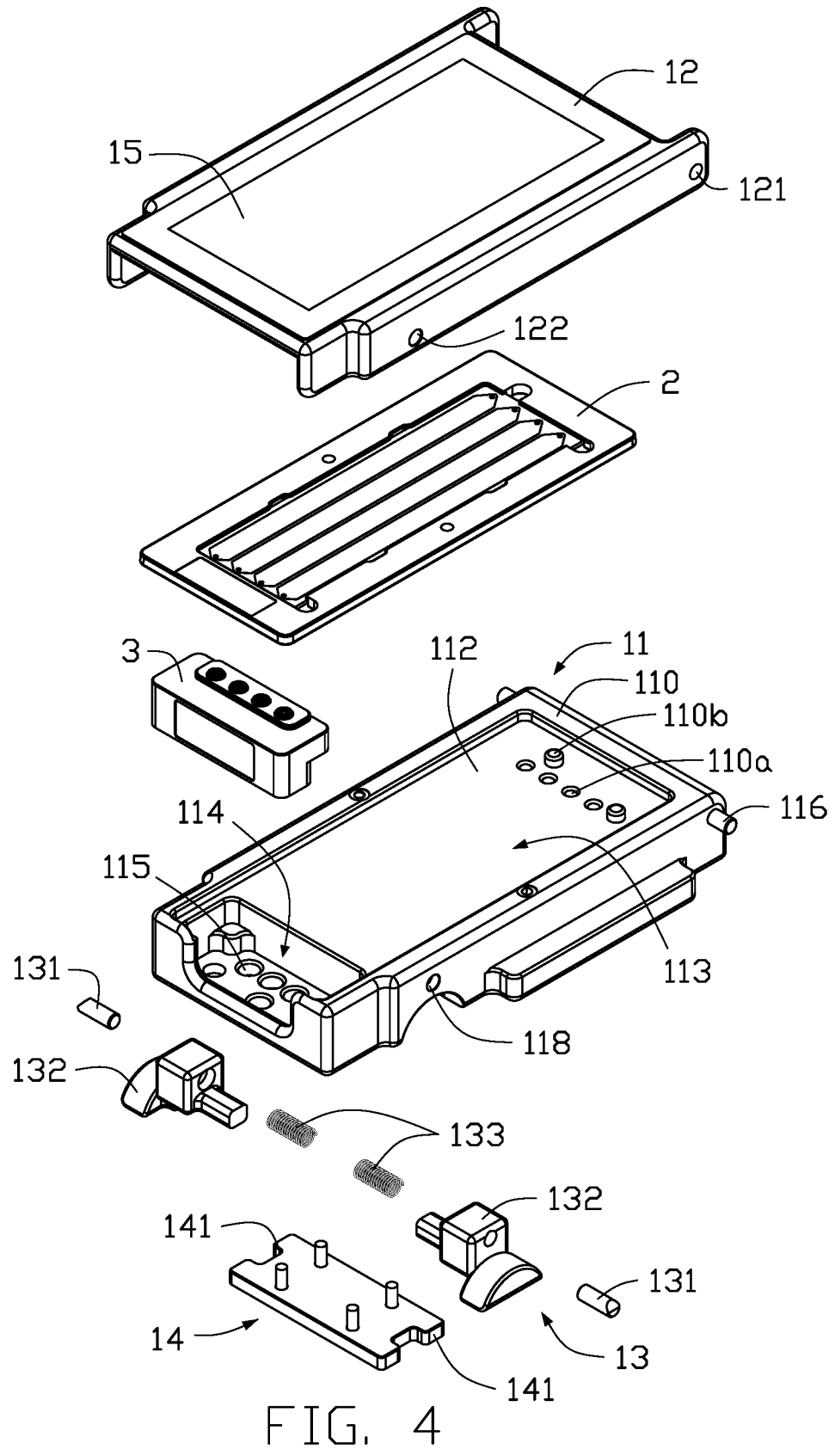
FIG. 4 is an exploded isometric view of the portable sample loading device loaded with the sequencing chip of FIG. 3.
Figure 5:
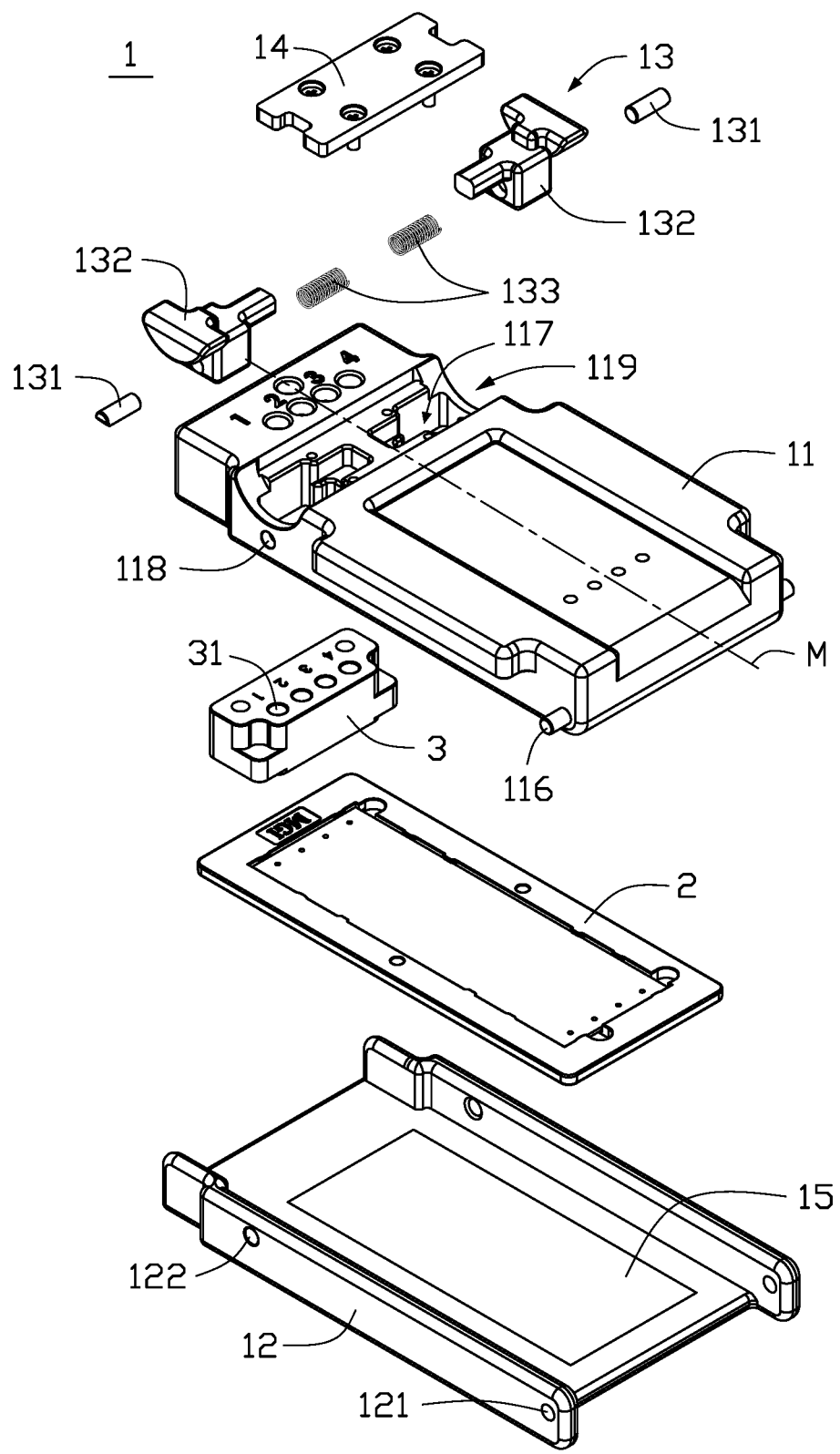
FIG. 5 is an exploded isometric view of the portable sample loading device loaded with the sequencing chip of FIG. 4, from another angle.

Portable sample loading device 1, 4, 7 Flow cell 2
Chip 5 Sample loading connector 3, 6
Base 11, 41, 71 Fixing device 12, 42, 72
Front surface 110, 410, 710 Back surface 111, 411, 711
Supporting Leading surface 112, 412, 712 Accommodating space 113
Receiving space 114, 117, 414, 714 Sample injection hole 115, 415, 715
Pivot shaft 116, 422, 716, 719 Hole portion 121, 416, 421, 721
Locking device 13, 43, 73 Buckle 131, 432, 732
Button portion 132 Reset portion 133
Central axis M Through hole 118, 122, 31, 110a, 411a,
Cover plate 14 Notch 119

Limiting portion 141 Visualization window 15, 45, 75
View window 411b Hook 431, 731
Reflecting mirror 46 Supporting structure 47
Opening 731a Hook portion 731b
Supporting substrate 76 Receiving portion 717
Inner wall 718 Groove 761
First channel 1501 Second channel 1502
Concave surface 1503 Bubble 1504
Positioning protrusion 110b

DETAILED DESCRIPTION

Implementations of the disclosure will now be described, by way of embodiments only, with reference to the drawings. The described embodiments are only portions of the embodiments of the present disclosure, rather than all the embodiments. The disclosure is illustrative only, and changes may be made in the detail within the principles of the present disclosure. It will, therefore, be appreciated that the embodiments may be modified within the scope of the claims.

It should be noted that when a component is referred to as being "fixed to" or "mounted on" another component, the component can be directly on another component or a middle component may exist therebetween. When a component is considered to be "arranged on" another component, the component can be directly on another component or a middle component may exist therebetween. The term "and/or" as used herein means any combinations of one or more related listed items.

Referring to FIGS. 1-5, an embodiment of a portable sample loading device is illustrated. The portable sample loading device 1 is used to load a sample to a chip, such as a sequencing chip or a microfluidic chip. Take the portable sample loading device 1 used to load the sample to a flow cell for sequencing for example. The portable sample loading device 1 includes a base 11 and a fixing device 12 connected to the base 11. The base 11 is used to support a flow cell 2 and a sample loading connector 3. The fixing device 12 is used to detachably retain the flow cell 2 and the sample loading connector 3 on the base 11. The base 11 may be made of organic glass, polycarbonate, polyetherimide (PEI), ABS plastic, elastomer, etc., and a combination thereof.

The base 11 includes a front surface 110 and a back surface 111 opposite to the front surface 110. The front surface 110 includes a supporting leading surface 112 for supporting the flow cell 2. In the embodiment, a region of the front surface 110 is recessed toward the back surface 111 to form the supporting surface 112. An accommodating space 113 for receiving the flow cell 2 is formed above the supporting surface 112. A region of the supporting surface 112 corresponding to a sample inlet of the flow cell 2 is further recessed toward the back surface 111 to form a receiving space 114 for receiving the sample loading connector 3. In the embodiment, the shape and the size of the supporting surface 112 match the shape and the size of the flow cell 2. The supporting surface 112 is approximately rectangular, and one end of the rectangular supporting surface 112 is recessed toward the back surface 111 to form the receiving space 114. One or more sample injection holes 115 corresponding to the injection port of the flow cell 2 are defined at a bottom of the receiving space 114. The sample injection holes 115 penetrate through the bottom of the receiving space 114 and the back surface 111. In other embodiments, the supporting surface 112 may be a surface parallel to other regions of the front surface 110 or a surface protruding from the other regions. In other embodiments, the sample injection hole may also be defined at a sidewall of the receiving space 114 and penetrate the sidewall. The supporting surface 112 further defines a through hole 110a penetrating the supporting surface 112 and the back surface 111. The through hole 110a corresponds to a sample outlet (not shown) of the flow cell 2. The supporting surface 112 further includes a positioning protrusions 110b for positioning the flow cell 2.

In the embodiment, the fixing device 12 is a cover, one end of which is pivotally connected to the base 11 through a pivoting device. The pivoting device includes a pivot shaft 116 disposed at one end of the base 11 and a hole portion 121 corresponding to the pivot shaft 116 and disposed at one end of the fixing device 12. One end of the fixing device 12 can rotate around one end of the base 11 through the pivoting device. During the rotation, the other end of the fixing device 12 moves towards or away from the base 11, thereby closing or open the portable sample loading device 1. The positions of the pivot shaft 116 and the hole portion 121 of the pivot device can also be exchanged. For example, the pivot shaft 116 is disposed on the fixing device 12, and the hole portion 121 is disposed on the base 11.

The portable sample loading device 1 further includes a locking device 13. When the portable sample loading device 1 is in a closed state, the locking device 13 can engage the fixing device 12 with the base 11, so that the fixing device 12 can remain close to fix the flow cell 2 loaded thereon.

In the embodiment, the locking device 13 is mounted on the back surface 111 of the base 11, and includes a buckle 131, a button portion 132, and a reset portion 133. The buckle 131 and the reset portion 133 are both mounted on the button portion 132. Under an external force, such as when a user presses the button portion 132, the button portion 132 drives the buckle 131 to retract to disengage the fixing device 12 from the buckle 131. Thus, the fixing device 12 can move relative to the base 11 to open the portable sample loading device 1. After the external force is removed, the button portion 132 drives the buckle 131 to extend under the pressure of the reset portion 133. Thus, the buckle 131 is engaged with the fixing device 12 again, so that the fixing device 12 remains close to fix the flow cell 2 loaded thereon.

In the embodiment, two locking devices 13 are included, which are symmetrically mounted on the base 11 in a direction central axis M perpendicular to the pivot shaft 116. Specifically, two regions of the back surface 111 of the base 11 symmetrically along the central axis M are recessed towards the front surface 110 to form two receiving rooms 117 for receiving the locking devices 13. A sidewall of each receiving room 117 away from the other receiving room 117 defines a through hole 118. The fixing device 12 also defines a through hole 122 or a recess corresponding to the through hole 118. The buckle 131 can extend through or retract from the through hole 118, and can extend into or exit out of the through hole 122 or the recess, thereby engaging with or disengaging from the clamping fixture 12.

In other embodiments, only one locking device 13 may be included.

In other embodiments, the locking device 13 may also be disposed on the fixing device 12, and the base 11 defines the through hole or the recess.

The portable sample loading device 1 further includes a cover plate 14. The cover plate 14 is fixed above the two receiving rooms 117, and covers inner spaces of the two receiving rooms 117 close to each other. Outer spaces of the two receiving rooms 117 away from each other communicate with outside environment. Each button portion 132 is partially received in the inner space of the corresponding receiving room 117, and is limited between the base 11 and the cover plate 14. The other portion is exposed from the outer space of the corresponding receiving room 117, so that the user can pass the exposed portion of the button portion 132. Along the pressing direction of the user, a length of each receiving room 117 is greater than a length of the button portion 132. In the embodiment, the sidewall of each receiving room 117 away from the other receiving room 117 defines a notch 119. The user can press the button portion 132 through the notch 119. Along a direction perpendicular to the sidewall defining the notch 119, the length of each receiving room 117 is greater than the length of the button portion 132. Thus, when the user presses the button portion 132, the button portion 132 moves towards the inner space of the receiving room 117, and at the same time drives the buckle 131 to exit out of the through hole 122.

The cover plate 14 further includes a limiting portion 141. The limiting portion 141 can limit the moving distance of the button portion 132 when the button portion 132 is pressed. In the embodiment, the limiting portion 141 is an end of the cover plate 14. In other embodiments, the limiting portion 141 may also be another structure formed on the cover plate 14. For example, the limiting portion 141 may be a structure extending from the end of the cover plate 14 or the other parts of the cover plate 14 to the receiving room 117. The cover plate 14 can also cover the entire receiving room 117, that is, the button portion 132 is exposed only from the notch 119, and not exposed from other positions. In other embodiments, the notch 119 may also be omitted, and the button portion 132 extends out of the portion of the receiving room 117 not covered by the cover plate 14, to which the external force can be applied.

The reset portion 133 is arranged along the direction of the user pressing the button portion 132, and can be elastically deformed along the direction. In the direction, one end of the reset portion 133 abuts against the button portion 132, and the other end abuts against a fixing component in the receiving room 117. For example, the other end of the reset portion 133 abuts against the sidewall of the receiving room 117. When the user presses the button portion 132, the button portion 132 moves in the pressing direction and compresses the reset portion 133, causing the reset portion 133 to deform. After the user stops pressing the button portion 132, the reset portion 133 rebounds to return the button portion 132 to its original position. In the embodiment, the reset portion 133 is an elastic element, and more specifically, the reset portion 133 is a spring.

The portable sample loading device 1 further includes a visualization window 15 arranged on the fixing device 12. Furthermore, the visualization window 15 corresponds to the flow cell 2. The visualization window 15 includes scale marks for marking the various spaces (channels) inside the flow cell 2 that can be filled with the biological sample. The scale marks can be arranged in, but not limited to, a crisscross grid shape. The scale marks have length measuring and coordinate positioning functions to evaluate the states of the biological sample in the flow cell 2, for example, to determine a loading speed of biological sample, locate the positions of unexpected bubbles, etc. Thus, the loading effect of the biological sample and the impact on sequencing quality can be evaluated. The visualization window 15 can be made of, but not limited to, a transparent material or a material that does not block the light of sight, such as transparent glass or plastic.

In one embodiment, the visualization window 15 is formed by adding the scale marks to a specific region of the fixing device 12. In another embodiment, the visualization window 15 is mounted on a specific region of the fixing device 12. For example, the specific region of the fixing device 12 is hollow, and the visualization window 15 is fixed in the hollow region.

When the portable sample loading device 1 is used to load the biological sample, the sample loading process includes following steps.

In step 1, the button portion 132 is pressed to open the portable sample loading device 1, and the sample loading connector 3 is placed into the receiving space 114. The through holes 31 of the sample loading connector 3 faces the sample injection hole 115 at the bottom of the receiving space 114. In the embodiment, the sample loading connector 3 is a disposable connector, and the volume of the through hole 31 is approximately a microliter. The through hole 31 can be arranged to have a single channel, multiple channels, a channel with an inlet and multiple outlets, or a combination thereof in series or in parallel. The sample loading connector 3 can be made of engineering plastic, metal, rubber ring, rubber, polydimethylsiloxane (PDMS), other elastomers, or a combination thereof.

In step 2: the flow cell 2 is supported on the supporting surface 112 of the base 11, causing the sample inlet of the flow cell 2 to face the through hole 31 of the sample loading connector 3, and the sample outlet of the flow cell 2 to face the through hole 110a that penetrating the supporting surface 112 and the back surface 111.

In step 3: the biological sample is sucked by a pipette, which is further loaded into the through hole 31 of the sample loading connector 3 through the sample injection hole 115 of the base 11, so that the reagents enter the flow cell 2 under the action of gravity and capillary force and infills the entire chamber of the flow cell 2.

In step 4: the displacement and the position of a front edge of the reagents in the chamber of the flow cell 2 is timed and observed by the scale marks of the visualization window 15, and the loading speed of the biological sample is calculated accordingly. At the same time, the position of unexpected bubbles in the chamber is recorded to calculate the bubble volume, thereby evaluating the loading effect of the biological sample and the impact on the sequencing quality.

In step 5: after the sample loading is completed, the button portion 132 is pressed to open the portable sample loading device 1. The flow cell 2 is unloaded.

Figure 6:
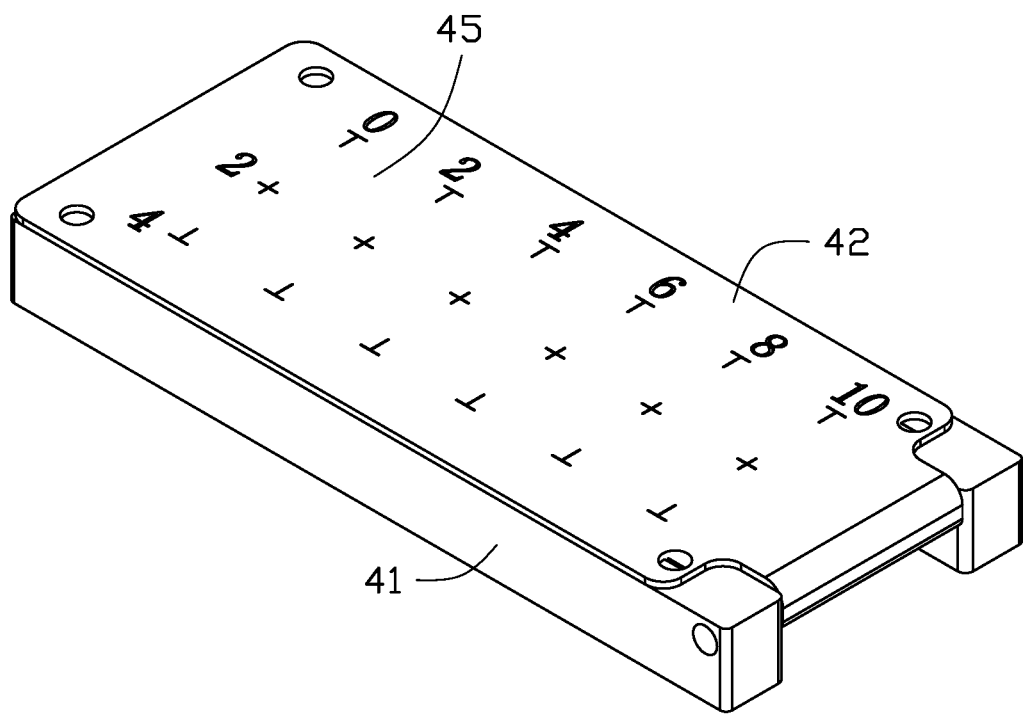
FIG. 6 is an isometric view of a second embodiment of a portable sample loading device according to the present disclosure.
Figure 7:
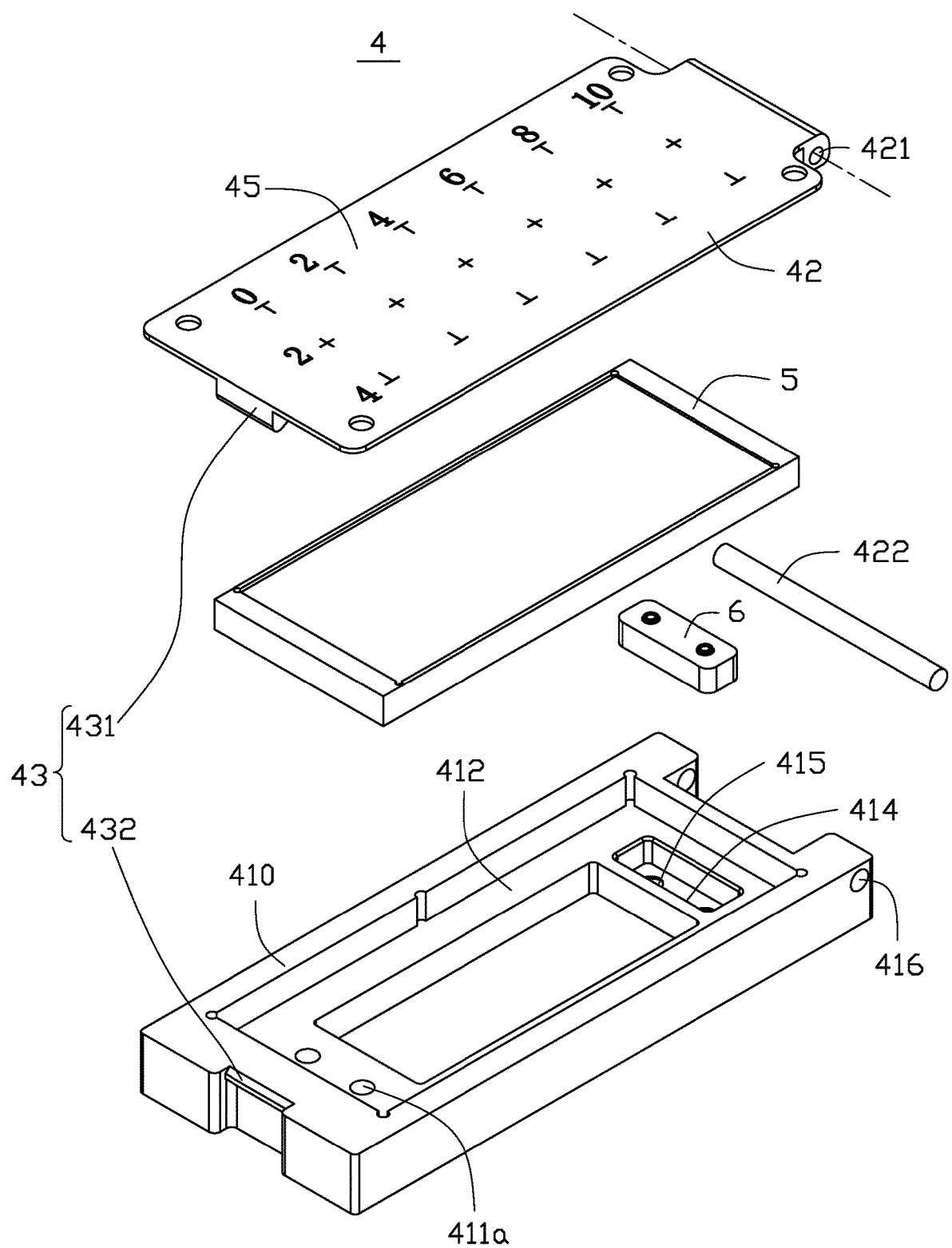
FIG. 7 is an exploded isometric view of the portable sample loading device of FIG. 6.
Figure 8:
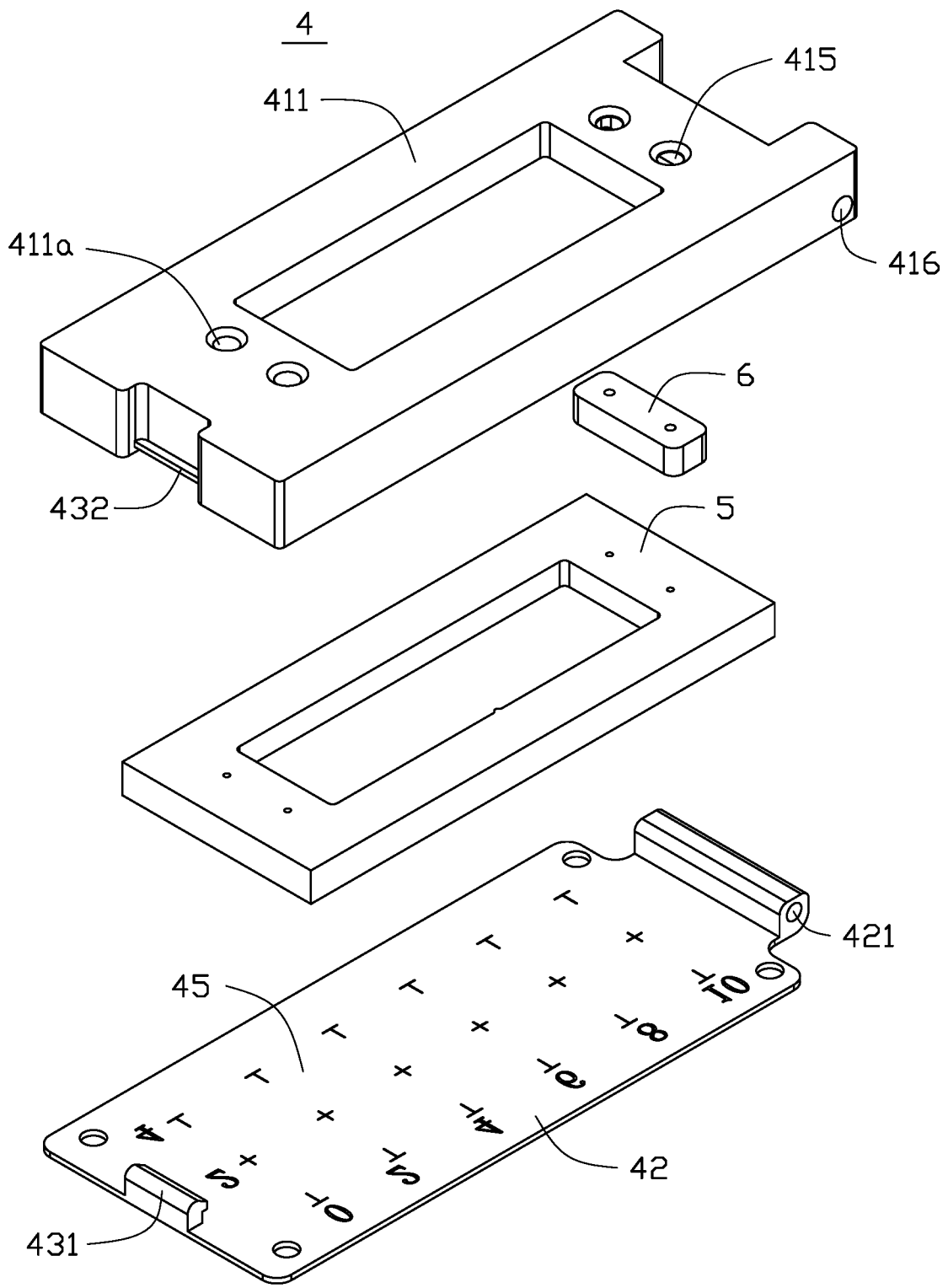
FIG. 8 is an exploded isometric view of the portable sample loading device of FIG. 6, from another angle.

Referring to FIGS. 6-8, another embodiment of a portable sample loading device is illustrated. The portable sample loading device 4 is used to load a sample to a chip, such as a sequencing chip or a microfluidic chip. The portable sample loading device 7 includes a base 71 and a fixing device 72 connected to the base 71. The base 41 is used to support a chip 5 and a sample loading connector 6. The fixing device 42 is used to retain the chip 5 on the base 41.

The base 41 includes a front surface 410 and a back surface 411 opposite to the front surface 410. The front surface 410 includes a supporting surface 412 for supporting the chip 5. In the embodiment, a region of the front surface 410 is recessed toward the back surface 411 to form the supporting surface 412. A region of the supporting surface 412 corresponding to the sample inlet of the chip 5 is further recessed toward the back surface 411 to form a receiving space 414 for receiving the sample loading connector 6. One or more sample injection holes 415 are defined at a bottom of the receiving space 414. The sample injection holes 415 penetrate the bottom of the receiving space 414 and the back surface 411. An end of the supporting surface 412 away from the receiving space 414 further defines a through hole 411a. The through hole 411a corresponds to the sample outlet of the chip 5.

The fixing device 42 is pivotally connected to the base 41 through a pivoting device. The pivoting device includes a hole portion 416 disposed at one end of the base 41, a hole portion 421 disposed at one end of the fixing device 42, and a pivot shaft 422 passing through the hole portions 416, 421 and pivotally connecting the fixing device 42 to the base 41. The other end of the fixing device 42 can move towards or away from the base 41 through the pivoting device, thereby closing or open the portable sample loading device 4.

The portable sample loading device 4 further includes a locking device 43. The locking device 43 can engage the fixing device 42 with the base 41 when the portable sample loading device 4 is in the closed state, so that the fixing device 42 can retain close to fix the chip 5 loaded thereon.

In the embodiment, the locking device 43 is mounted on a side of the portable sample loading device 4 opposite to the pivoting device, and includes a hook 431 disposed on the fixing device 42 and a buckle 432 disposed on the base 41. After the fixing device 42 and the base 41 are closed with each other, the hook 431 on the fixing device 42 is engaged with the buckle 432 on the base 41, so that the fixing device 42 can retain close to fix the chip 5 loaded thereon.

In the embodiment, the portable sample loading device 4 further includes a visualization window 45 disposed on the fixing device 42. Furthermore, the visualization window 45 corresponds to the chip 5. The visualization window 45 includes scale marks for marking the various spaces inside the chip 5 that can be filled with the biological sample. The scale marks can be arranged in, but not limited to, a crisscross grid shape. The scale marks have length measuring and coordinate positioning functions to measure the states of the biological sample in the chip 5. Thus, the loading effect of the biological sample and the impact on the sequencing quality can be evaluated. The visualization window 45 can be made of, but not limited to, a transparent material or a material that does not block the light of sight, such as transparent glass or plastic. The visualization window 45 can be formed by adding the scale marks to a specific region of the fixing device 42. The visualization window 45 can also be a separated component mounted on a specific region of the fixing device 42.

Figure 9:
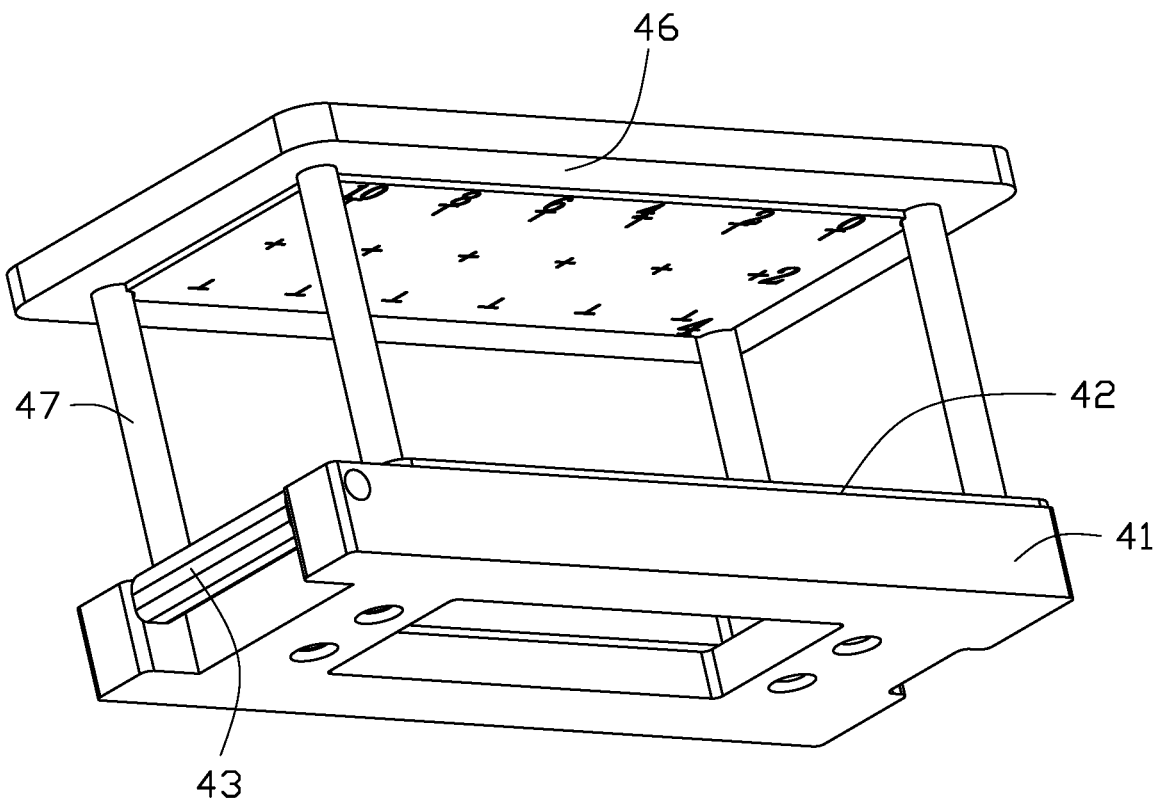
FIG. 9 is an isometric view of a visualization window added to the portable sample loading device of FIG. 6.
Figure 10:
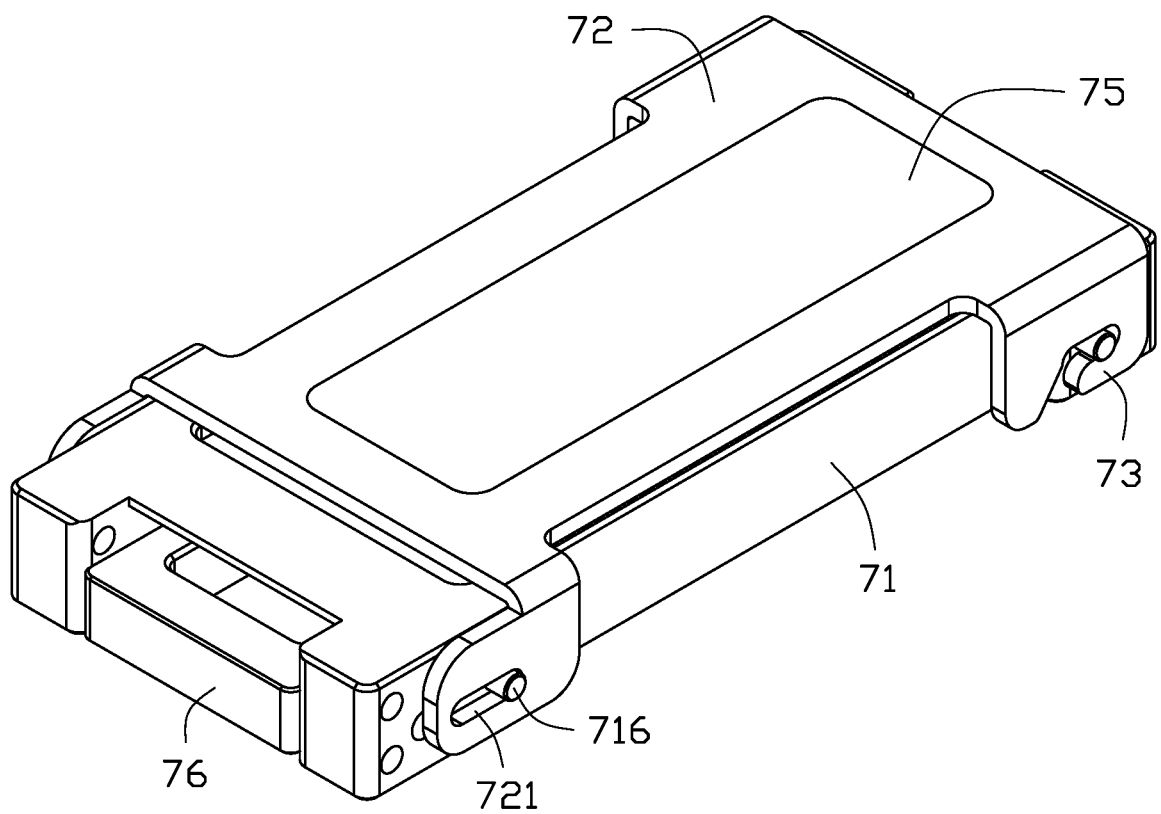
FIG. 10 is an isometric view of a third embodiment of a portable sample loading device according to the present disclosure.
Figure 11:
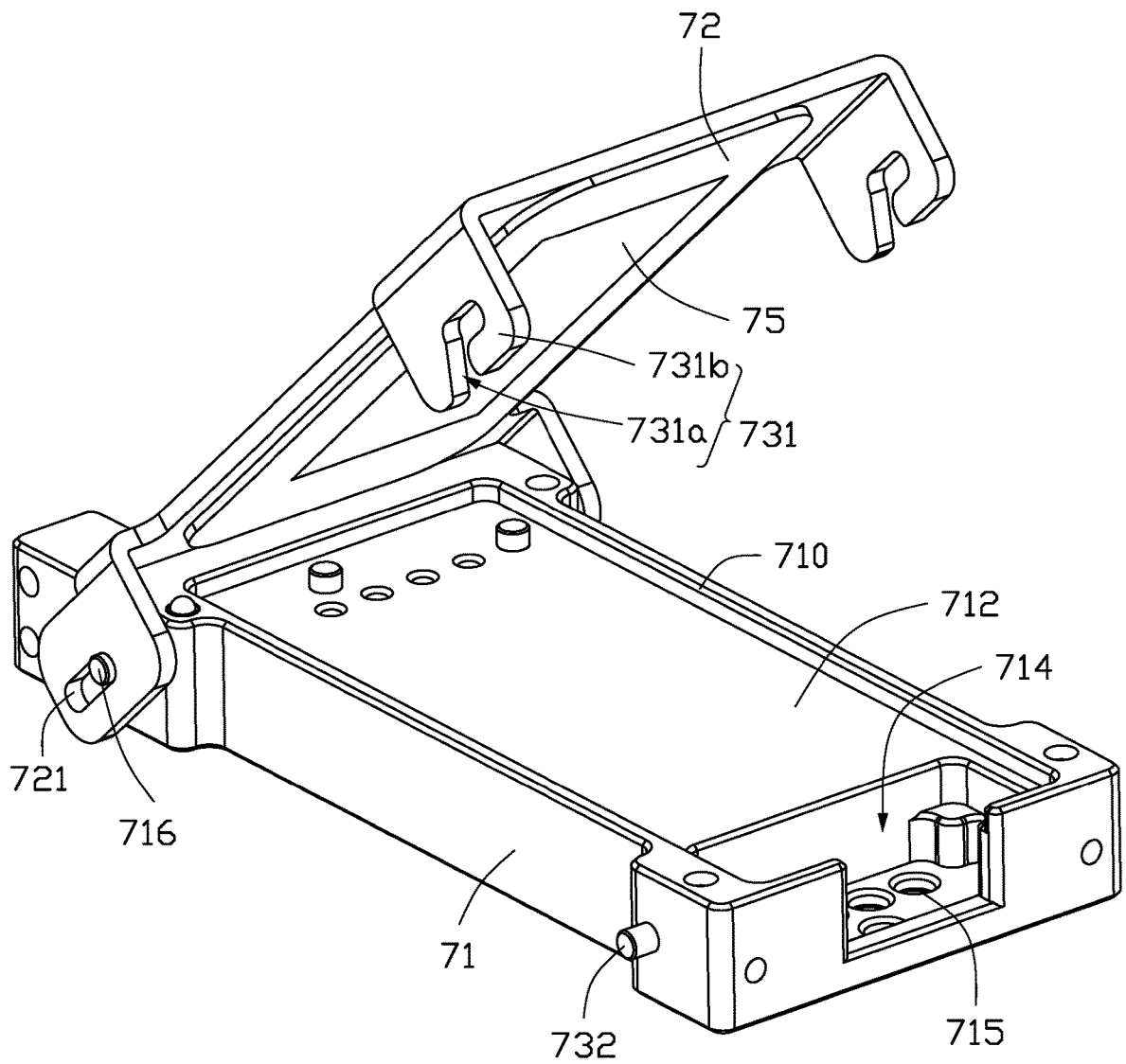
FIG. 11 is an isometric view of the portable sample loading device of FIG. 10 in an open state.
Figure 12:
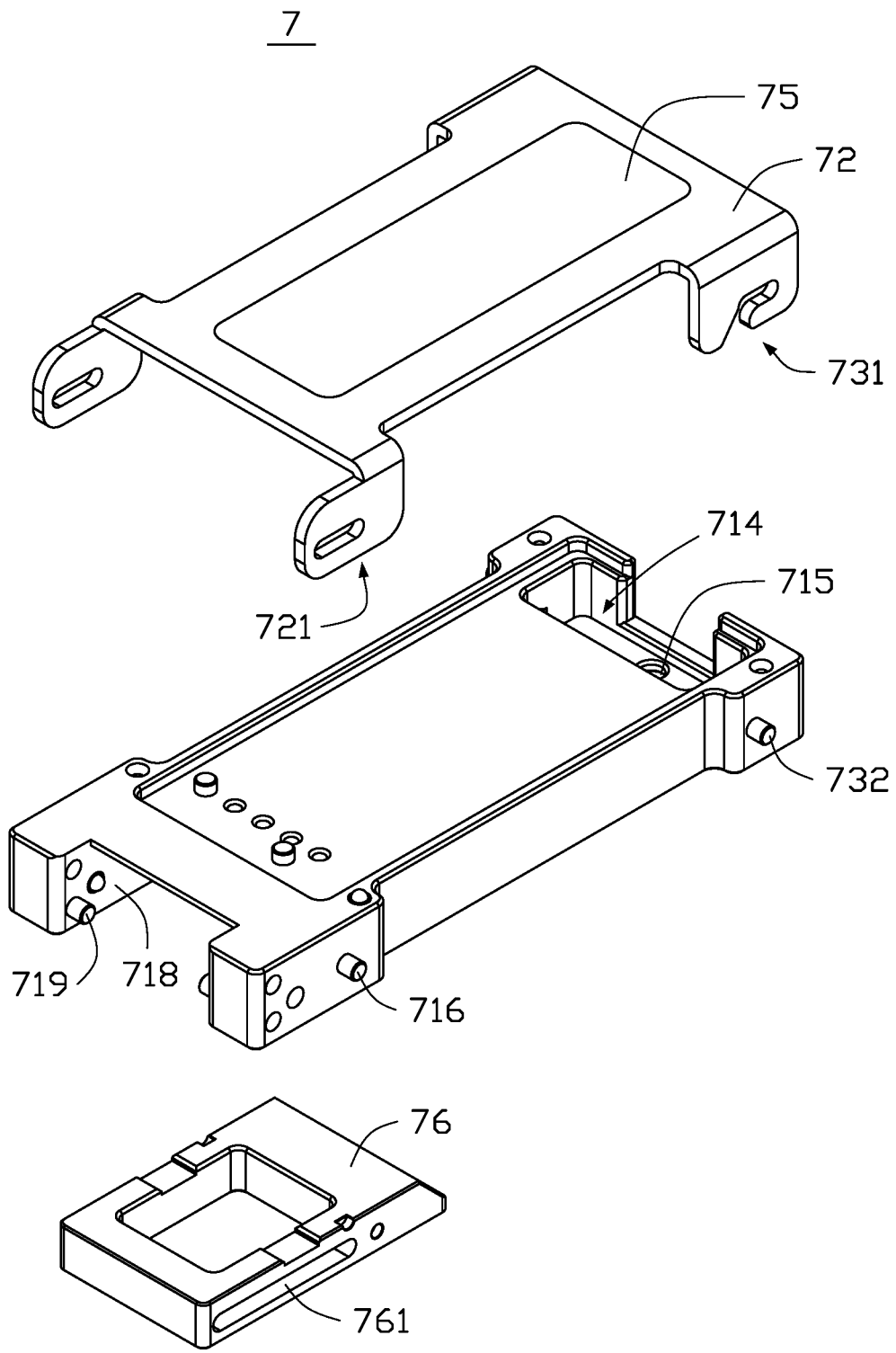
FIG. 12 is an exploded isometric view of the portable sample loading device of FIG. 10.
Figure 13:
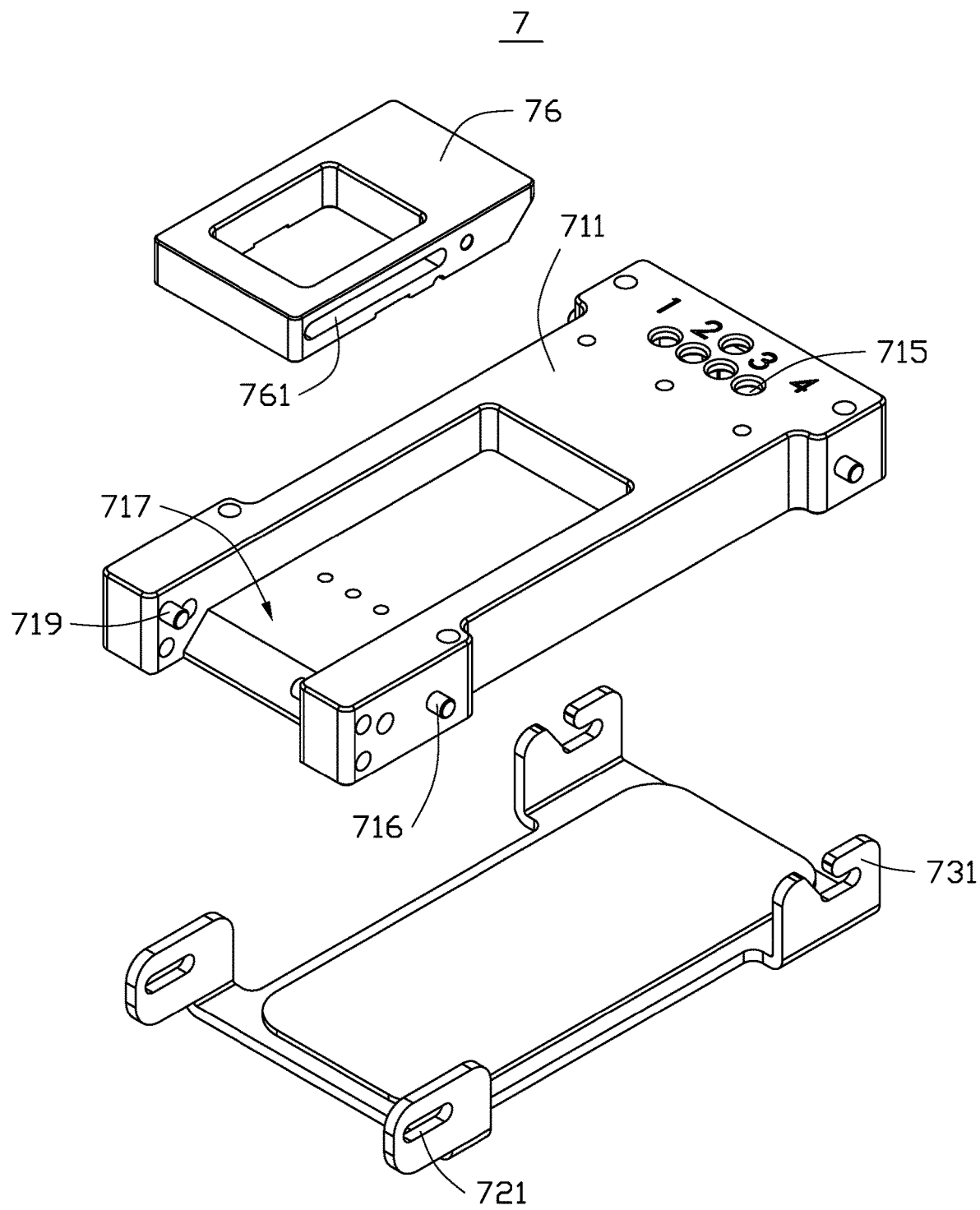
FIG. 13 is an exploded isometric view of the portable sample loading device of FIG. 10, from another angle.
Figure 14:
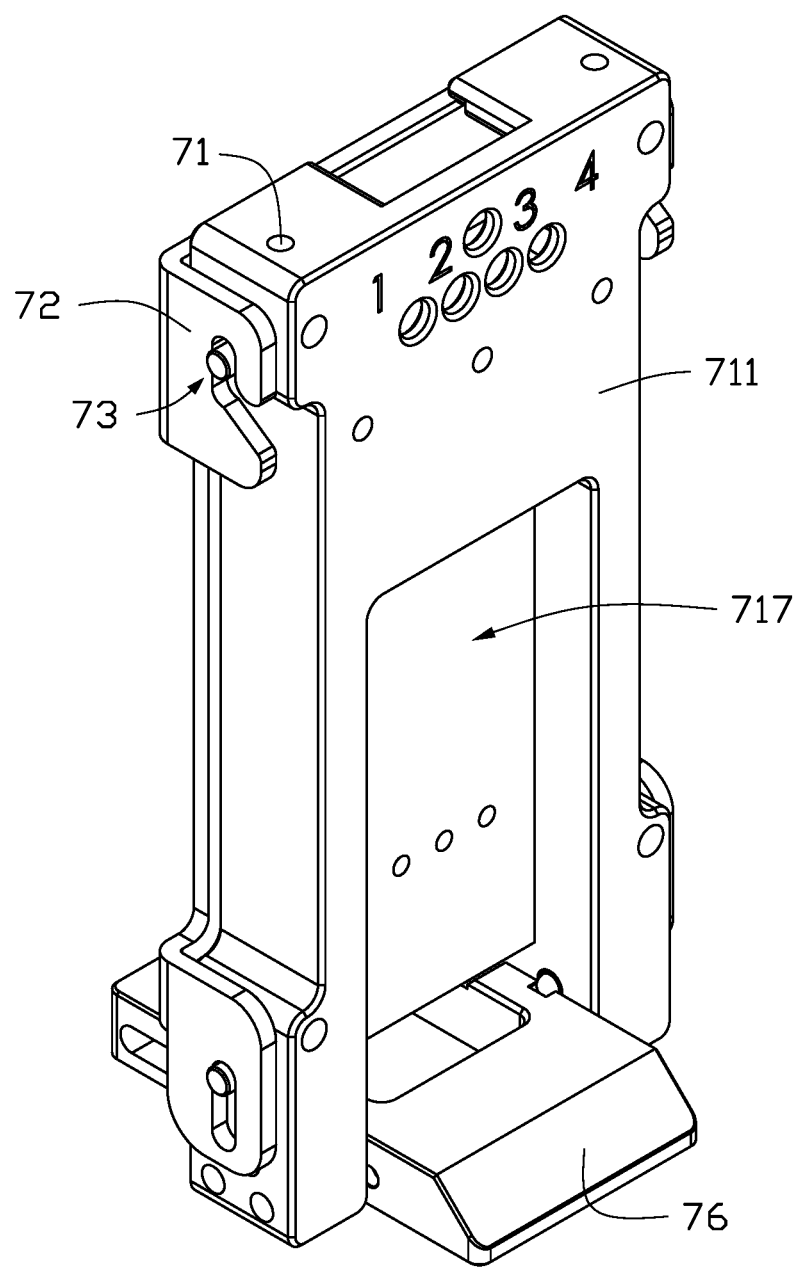
FIG. 14 is an isometric view of the portable sample loading device of FIG. 10 in an upright state.

Referring to FIG. 9, the portable sample loading device 4 may further include a reflecting mirror 46 and a supporting structure 47 for supporting the reflecting mirror 46 on the base 41. The reflecting mirror 46 parallelly faces the visualization window 45. The supporting structure 47 may be a plurality of magnetic attractors for supporting the reflecting mirror on the base 41. The states of the biological sample in the chip 5 and the visualization window 45 can both be imaged on the reflecting mirror 46. In addition, since the supporting structure 47 supports the reflecting mirror 46 away from the base 41, the user can observe and evaluate the states of the sample directly through the gaps defined by the supporting structures 47.

The reflecting mirror 46 is made of, but not limited to, flat reflecting mirror, steel, chrome plated metal plate, polished chrome plate, etc.

In another embodiment, the reflecting mirror 46 also includes with scale marks for marking the various spaces inside the chip 5 that can be filled with the biological sample. In yet another embodiment, the fixing device 42 is not provided with the visualization window 45, but the scale marks are arranged on the reflecting mirror 46 to evaluate the states of the biological sample in the chip 5.

Referring to FIGS. 10-14, a third embodiment of a portable sample loading device is illustrated. The portable sample loading device 7 is used to load a sample to a chip, such as a sequencing chip or a microfluidic chip. The portable sample loading device 7 includes a base 71 and a fixing device 72 connected to the base 71. The base is used for supporting a chip (not shown) and a sample loading connector (not shown). The fixing device 72 is used for retaining the chip on the base 71.

The base 71 includes a front surface 710 and a back surface 711 opposite to the front surface 710. The front surface 710 includes a supporting surface 712 for loading the chip. In the embodiment, a region of the front surface 710 is recessed toward the back surface 711 to form the supporting surface 712. A region of the supporting surface 712 corresponding to the sample inlet of the chip is further recessed toward the back surface 711 to form a receiving space 714 for receiving the sample loading connector. One or more sample injection holes 715 are defined at a bottom of the receiving space 714. The sample injection holes 715 penetrate through the bottom of the receiving space 714 and the back surface 711.

The fixing device 72 is pivotally connected to the base 71 through a pivoting device. The pivoting device includes a pivot shaft 716 disposed at one end of the base 71 and a hole portion 721 corresponding to the pivot shaft 716 and disposed at one end of the fixing device 72. The hole portion 721 includes a height matching the diameter of the pivot shaft 716 and a length greater than the diameter of the pivot shaft 716. The height of the hole portion 721 is arranged from the front surface 710 to the back surface 711 of the base 71. The length is arranged along the end of the fixing device 72 pivotally connected to the base 71 to the other opposite end. Therefore, the fixing device 72 can not only rotate around one end of the base 71 through the pivoting device, but also move relative to the base 71 along the end of the base 71 having the pivot shaft 716 to the other opposite end.

The portable sample loading device 7 further includes a locking device 73. The locking device 73 can engage the fixing device 72 with the base 71 when the portable sample loading device 7 is in the closed state, so that the fixing device 72 can retain close to fix the chip loaded thereon.

In the embodiment, the locking device 73 is mounted on a side of the portable sample loading device 7 opposite to the pivoting device, and includes a hook 731 disposed on the fixing device 72 and a buckle 732 disposed on the base 71. After the fixing device 72 and the base 71 are closed with each other, the hook 731 on the fixing device 72 is engaged with the buckle 732 on the base 71, so that the fixing device 72 can retain close to fix the chip loaded thereon.

Specifically, in the embodiment, the hook 731 includes an opening 731a and a hook portion 731b. The opening 731a is disposed in front of or behind the hook portion 731b along the length direction of the hole portion 721. The buckle 732 is a post protruding from the base 71, and the radial size of the post allows the post to pass through the opening 731a, and to enter and engage with the hook portion 731b. When the fixing device 72 and the base 71 are closed with each other, the fixing device 72 is moved along the length direction of the hole portion 721, to cause the opening 731a of the hook 731 to align with the post. Then, the fixing device 72 is reversely moved along the length direction of the hole portion 721, to cause the post to enter and engage with the hook portion 731b. Then, the engagement is finished, and the fixing device 72 can retain close to fix the chip loaded thereon. It can be understood that the disengagement process is an inverse process of the above engagement process, and will not be repeated here.

It can be understood that the components of the pivoting device on the base 71 and the fixing device 72 can be exchanged to achieve the same function. The components of the locking device 73 on the base 71 and the fixing device 72 can also be exchanged to achieve the same function.

The portable sample loading device 7 further includes a visualization window 75 disposed on the fixing device 72. Furthermore, the visualization window 75 corresponds to the chip. The visualization window 75 includes scale marks for marking the various spaces inside the chip that can be filled with the biological sample. The scale marks can be arranged in, but not limited to, a crisscross grid shape. The scale marks have length measuring and coordinate positioning functions to measure the states of the biological sample in chip. Thus, the loading effect of the biological sample and the impact on the sequencing quality can be evaluated. The visualization window 75 can be made of, but not limited to, a transparent material or a material that does not block the light of sight, such as transparent glass or plastic.

The portable sample loading device 7 further includes a supporting substrate 76. The supporting substrate 76 can be received on the back surface 711 of the base 71. The base 71 and the supporting substrate 76 can also rotate relative to each other, so that the supporting substrate 76 can support the portable sample loading device 7 in an upright state. The upright state means that the end of the portable sample loading device 7 with the locking device 73 faces upwards and the end with the pivoting device faces downwards. Specifically, a side of the back surface 711 of the base 71 close to the pivoting device is recessed toward the front surface 710 to form a receiving portion 717. A pivot shaft 719 is disposed on two inner walls 718 of one end of the receiving portion 717 close to the pivoting device. The supporting substrate 76 defines grooves 761 corresponding to two ends of the pivot shaft 719. The grooves 761 have a size that matches the radially size of the pivot shaft 719 in one dimension, and has a size larger than the radially size of the pivot shaft 719 in another dimension. By pushing the supporting substrate 76 along the another dimension, the supporting substrate 76 can be received in or withdrawn from the receiving portion 717. After the supporting substrate 76 is withdrawn or partially withdrawn from the receiving portion 717, the base 71 rotates about the pivot shaft 719 to cause the supporting substrate 76 and the base 71 to approximately be perpendicular to each other. At this time, the portable sample loading device 7 can be supported on the supporting substrate 76, and the portable sample loading device 7 is in the upright state.

Only three different embodiments of the locking device are described above. However, according to the engaging principle of the locking device, various changes may be made to obtain other locking devices, and such locking devices can be applied to the portable sample loading device of the present disclosure.

The application of the above-mentioned portable sample loading device 1, 4, and 7 of the present disclosure will be described below.

Case 1, the portable sample loading device 1 is used to load DNA sample required for human whole-genome sequencing to a flow cell (semiconductor sequencing method).

1. Device structure. The flow cell 2 is a sequencing biochip with two channels. The height of the channel is 50 µm. One inner sidewall of the channel has a silicon surface modified by aminosilane groups, and the thickness is 1000

μm. Another inner sidewall is quartz with a thickness of 300 μm. The contact angle, when using water as the medium, is less than 70°. The disposable connector used as the sample loading connector 3 is a silicone rubber injection mold, which has a channel adapted to the size of the sample injection hole of the sequencing biochip, and can withstand a pressure of about 150 KPa after being compressed and sealed. The visualization window 15 is made by laser marking on an organic grass and cutting the organic glass. The pivot shaft 116 is made of corrosion-resistant metal material. The base 11 is made of aluminum alloy by machining.

2. Sequencing sample preparation. A sequencing library preparation kit (such as the MGIeasy DNA library rapid preparation kit) is used to prepare the DNA library sample required for human whole-genome sequencing.

3. Sample loading. The portable sample loading device 1 is sterilized by ultraviolet light or wiped with medical alcohol before use. The operator prepares the sample in accordance with the standard aseptic operating procedures. In order to save the sample, the volume required for each sample can be prepared according to the following calculation method:

$$\text{Sample volume}(\mu L) = 1.1 \times \text{channel}(\text{length} \times \text{width} \times \text{height}) \text{ mm}^3$$

The specific usage method is as follows.

The disposable connector and the sequencing biochip are placed into the base. The disposable connector is placed to be flat, and the through hole of the disposable connector is aligned with the sample injection hole 115 on the base.

The fixing device 12 is clamped, and whether the entrance of each channel of the sequencing biochip is aligned or blocked is optically checked.

The portable sample loading device 1 is horizontally placed on the desktop. A pipette is used to suck 30 μL of the prepared sample. A flared pipette tip can be used to suck enough sample without air bubbles in the pipette tip. The pipette is inserted into the sample injection hole 115 of the corresponding disposable connector, while making sure that the pipette contacts the sampling inlet of the sequencing biochip without the need to press the pipette knob.

The pipette is withdrawn from the pipette tip, and the sample is automatically sucked into the sequencing biochip under the action of capillary force. After the pipette is withdrawn, the pipette tip is not touched or moved, otherwise air bubbles may enter the sequencing biochip.

After loading the sample, the pipette tip is pulled out, and then the portable sample loading device 1 is put flat for about 10 minutes, allowing the DNA to bind to the chemical groups on the surface of the sequencing biochip. The portable sample loading device 1 can also be put on a sequencing biochip platform of a sequencer for 10 minutes.

After loading the sample, whether the reagents fully cover the sequencing biochip is observed through the visualization window 15. If so, the pipette tip is pulled out.

If the portable sample loading device 4 is used instead of the portable sample loading device 1 to load the DNA sample required for human whole-genome sequencing on the flow cell, after loading the sample, whether the reagents fully cover the sequencing biochip is observed through the visualization window 45. Whether the reagents fully cover the sequencing biochip can also be observed through the reflecting mirror 46.

Case 2, the portable sample loading device 7 is used to load the sample, and reagent flow pattern observing, bubble positioning, and area measuring are performed during the sample loading process.

The specific usage method is as follows.

The disposable connector and the sequencing biochip are placed into the portable sample loading device 7. The disposable connector is placed to be flat, and the through hole of the disposable connector is aligned with the sample injection hole 715 on the base. At this time, the translucent surface of the sequencing biochip faces the visualization window and the opaque surface faces the operator, so that the pipette tip can be inserted into the sample injection hole.

The fixing device 72 is engaged with the base 71, and whether the entrance of each channel of the sequencing biochip is aligned or blocked is checked.

The portable sample loading device 7 is horizontally placed on the desktop. A pipette is used to suck 30 μL of the prepared sample. A flared pipette tip can be used to suck enough sample without air bubbles in the pipette tip. The pipette is inserted into the sample injection hole 715 of the corresponding disposable connector, while making sure that the pipette contacts the sampling inlet of the sequencing biochip without the need to press the pipette knob.

The pipette is withdrawn from the pipette tip, and the sample is automatically sucked into the sequencing biochip under the action of capillary force.

After loading the sample, the pipette tip is pulled out, and then the device is put flat for about 30 minutes, allowing the DNA to bind to the chemical groups on the surface of the sequencing biochip.

Figure 15:
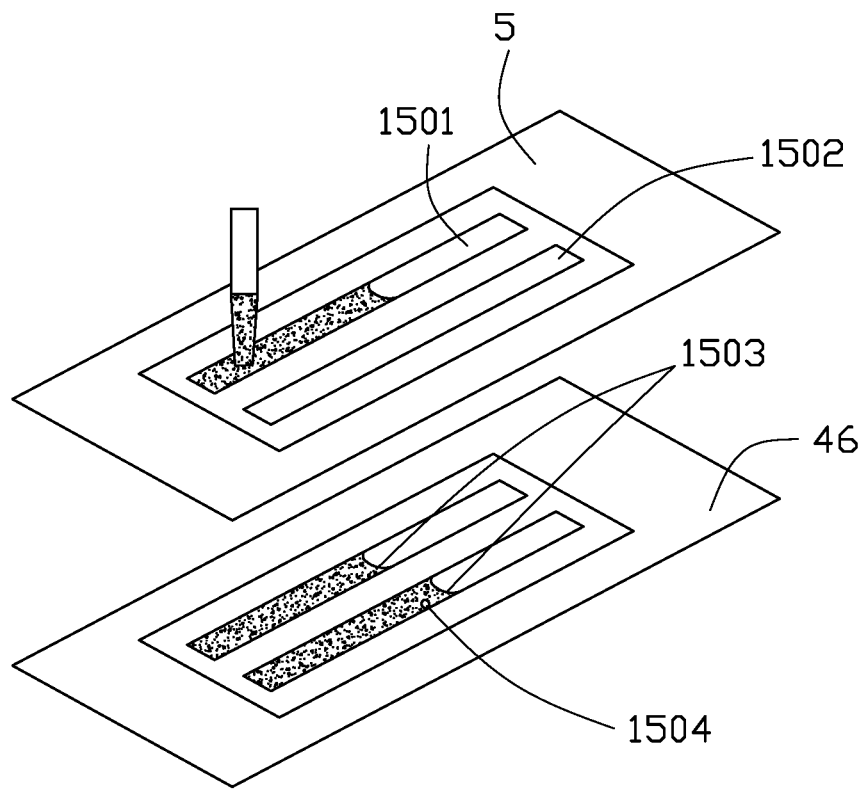
FIG. 15 is an isometric view showing sample being loaded using the portable sample loading device according to the present disclosure and the sample loading process being evaluated.

For the reagent flow pattern observing, the bubble positioning, and the area measuring, referring to FIG. 15, the front edge of the sample within the first channel 1501 and the first channel 1502 presents a concave surface 1503 due to capillary function. Bubbles 1504 appear in the second channel 1502. The coordinates of the bubbles can be determined and the area of the bubbles can be measured through the horizontal and vertical scale markings. Thus, the states of the sample can be evaluated.

Case 2 uses the portable sample loading device 7 as an example, but it can be understood that the portable sample loading devices 1 and 4 can also be used in case 2 for the reagent flow pattern observing, the bubble positioning, and the area measuring during the sample loading process.

The present disclosure includes following advantages. 1. The device is portable and small in size, and the operation is simple. 2. There is no dead volume, and the sample consumption is small (about 30 microliters, which is one-third or one-fourth of that of the existing sample loading device). 3. During the sample loading process, the factors influencing the sample loading effect, including the flow speed, the flow state, and the bubble position, can be visually observed without complex sensor devices such as flow meters or computer control programs. 4. The sample loading manner is flexible, which includes loading a same sample or different samples into the channels of the single chip. As shown in the table below, when the sequencing quality is consistent (TotalReads>=335M, Q30>=85%), the volume of the sample can be saved by about 40% and the Duplicate rate value reflecting the damage degree of the sample is reduced by about 10%, compared with the existing automated sequencing sample loading device.

Comparison of Sequencing Results Between the Portable Sample Loading Device of the Present Disclosure and the Existing Automated Sample Loading Device

| | Sample size/ Channel | TotalReads (M) | Q30 (Q-score ≥ 30) (%) | Duplicate rate (%) |
|---|---|---|---|---|
| Existing automated sample loading device | 60 μL | 354.64 | 88.44 | 15.8 |
| Portable sample loading device of the present disclosure | 35 μL | 355.18 (≥335 Pass) | 88.09 (≥85 Pass) | 4.1 |

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A portable sample loading device, comprising:
a base; and
a fixing device connected to the base;
wherein the base is configured to support a chip and a sample loading connector, the fixing device is configured to detachably retain the chip and the sample loading connector on the base, the base comprises a front surface and a back surface opposite to the front surface, the front surface comprises a supporting surface configured for supporting the chip, a region of the supporting surface corresponding to a sample inlet of the chip is recessed toward the back surface to form a receiving space configured for receiving the sample loading connector, and the receiving space further defines a sample injection hole corresponding to the sample inlet of the chip;
wherein the portable sample loading device further comprises a visualization window aligned with the chip, the visualization window is disposed on the fixing device, and the visualization window allows for observation of states of a biological sample in the chip.

2. The portable sample loading device of claim 1, further comprising a locking device, wherein the locking device is operable to engage the fixing device with the base or disengage the fixing device from the base.

3. The portable sample loading device of claim 2, wherein one end of the fixing device is pivotally connected and rotate around the base, when the end of the fixing device rotates around the base, another end of the fixing device moves towards or away from the base, and is able to engage with the base by the locking device when moving towards the base.

4. The portable sample loading device of claim 1, wherein the base defines a through hole corresponding to a sample outlet of the chip.

5. The portable sample loading device of claim 2, wherein the locking device comprises a buckle, a button portion, and a reset portion, the buckle and the reset portion are disposed on the button portion, the buckle is configured to engage the fixing device with the base, the button portion is configured to drive the buckle to retract under an external force, causing the fixing device to disengage from the base, the reset portion is configured to push the button portion after the external force is removed from the button portion, causing the button portion to drive the buckle to extend and then engage the fixing device with the base.

6. The portable sample loading device of claim 5, wherein the locking device is disposed on the back surface of the base, and a region of the back surface is recessed toward the front surface to form a receiving room for receiving the locking device, a sidewall of the receiving room defines a through hole, the buckle is configured to extend through or retract from the through hole, thereby engaging the fixing device with or disengaged the fixing device from the base.

7. The portable sample loading device of claim 6, wherein the sidewall of the receiving room further defines a notch, and the button portion is exposed from the notch for the external force to press.

8. The portable sample loading device of claim 6, further comprising a cover plate disposed above and covering the receiving room, wherein the cover plate comprises a limit portion configured to limit a moving distance of the button portion when being pressed.

9. The portable sample loading device of claim 5, wherein the reset portion is an elastic element.

10. The portable sample loading device of claim 1, wherein the visualization window comprises scale marks for marking spaces inside the chip that is fillable with the biological sample.

11. The portable sample loading device of claim 1, further comprising a reflecting mirror, wherein the reflecting mirror is disposed above the base by a supporting structure or magnetic attraction, and the reflecting mirror faces the visualization window.

12. The portable sample loading device of claim 1, further comprising a supporting substrate configured for supporting the portable sample loading device in an upright state.

13. The portable sample loading device of claim 12, wherein the supporting substrate is rotatable relative to one end of the base, the supporting substrate is received in the base when rotating to a state, and supports the portable sample loading device in the upright state when rotating to another state.

14. The portable sample loading device of claim 13, wherein the back surface of the base is recessed toward the front surface to form a receiving portion for receiving the supporting substrate.

15. The portable sample loading device of claim 1, wherein the front surface is recessed towards the back surface to form an accommodating space, and the supporting surface is a bottom surface of the accommodating space.

16. The portable sample loading device of claim 1, wherein the portable sample loading device loads a biological sample to the chip through capillary force or gravity.

17. The portable sample loading device of claim 1, further comprising a reflecting mirror, wherein the reflecting mirror is disposed above the base by a supporting structure or magnetic attraction, and the reflecting mirror faces the visualization window.

* * * * *